United States Patent
Boufounos

(10) Patent No.: US 9,389,305 B2
(45) Date of Patent: Jul. 12, 2016

(54) METHOD AND SYSTEM FOR COMPRESSIVE ARRAY PROCESSING

(71) Applicant: Mitsubishi Electric Research Laboratories, Inc., Cambridge, MA (US)

(72) Inventor: Petros T Boufounos, Boston, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 364 days.

(21) Appl. No.: 13/778,704

(22) Filed: Feb. 27, 2013

(65) Prior Publication Data

US 2014/0240163 A1  Aug. 28, 2014

(51) Int. Cl.
| | | |
|---|---|---|
| G01S 7/02 | (2006.01) | |
| G01S 7/03 | (2006.01) | |
| G01S 13/04 | (2006.01) | |
| G01S 13/42 | (2006.01) | |
| H01Q 3/24 | (2006.01) | |
| G01S 13/00 | (2006.01) | |

(52) U.S. Cl.
CPC . *G01S 7/03* (2013.01); *G01S 13/04* (2013.01); *G01S 13/42* (2013.01); *H01Q 3/24* (2013.01)

(58) Field of Classification Search
CPC ............... H01Q 3/24; G01S 7/02; G01S 7/03; G01S 13/02; G01S 13/04; G01S 13/06; G01S 13/42
USPC ......... 342/27, 28, 73, 74, 81, 368–377, 25 R, 342/175, 195; 343/700 R, 705; 367/87, 95, 367/97; 600/300, 407, 437, 440, 441, 443, 600/447
See application file for complete search history.

(56) References Cited

U.S. PATENT DOCUMENTS

| | | | | |
|---|---|---|---|---|
| 4,121,209 A | * | 10/1978 | ap Rhys ........................ | 342/368 |
| 4,159,462 A | * | 6/1979 | Rocha et al. .................... | 367/97 |
| 4,265,126 A | * | 5/1981 | Papadofrangakis et al. .. | 600/441 |
| 4,749,995 A | * | 6/1988 | Hopwood et al. ............ | 342/371 |
| 4,845,507 A | * | 7/1989 | Archer et al. ................. | 342/374 |
| 5,414,433 A | * | 5/1995 | Chang .......................... | 342/375 |
| 5,573,001 A | * | 11/1996 | Petrofsky et al. ............. | 600/447 |
| 6,661,375 B2 | * | 12/2003 | Rickett et al. ................. | 342/372 |
| 6,680,698 B2 | * | 1/2004 | Eiges ............................ | 342/373 |
| 6,850,190 B2 | * | 2/2005 | Ryu et al. ...................... | 342/377 |
| 7,042,393 B1 | * | 5/2006 | Konapelsky et al. ......... | 342/372 |
| 7,274,336 B2 | * | 9/2007 | Carson ......................... | 343/705 |
| 7,474,262 B2 | * | 1/2009 | Alland .......................... | 342/371 |
| 7,579,982 B2 | * | 8/2009 | Matsuoka ..................... | 342/175 |
| 7,639,171 B2 | * | 12/2009 | Alland et al. ............... | 342/25 R |
| 8,344,945 B2 | * | 1/2013 | Craig et al. ................... | 342/372 |

* cited by examiner

*Primary Examiner* — Bernarr Gregory
(74) *Attorney, Agent, or Firm* — Gene Vinokur; James McAleenan; Hironori Tsukamoto

(57) ABSTRACT

Signals received by an array of sensing elements are processed by first positioning the sensing elements in a uniform grid of L locations, wherein each location to include or not to include a sensing element is selected during a design phase. The sensing elements are selected and grouped into subsets, wherein each subset contains one or more sensing elements, and each sensing element is a member of one or more subsets. The signals in each subset are linearly combined to produce a combined signal, which is then sampled to form an output channel, which can detect objects.

14 Claims, 4 Drawing Sheets

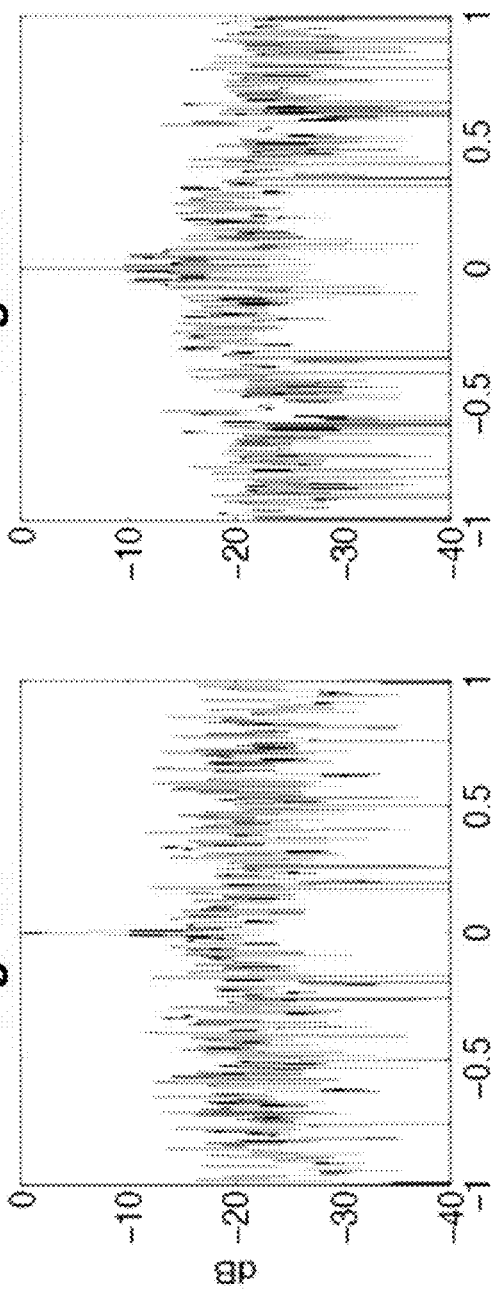
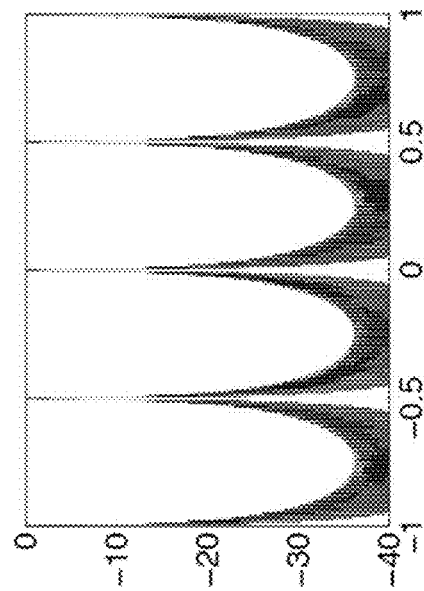
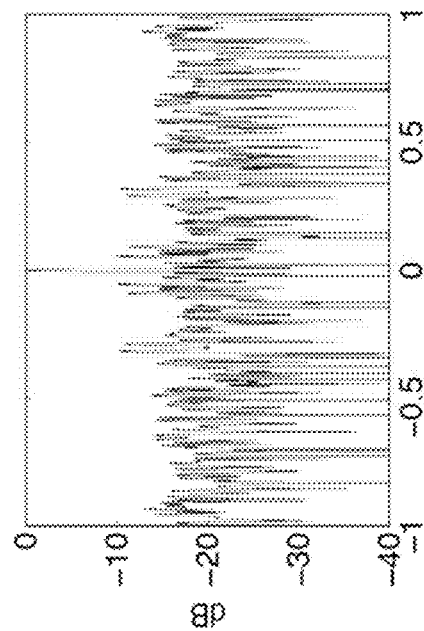
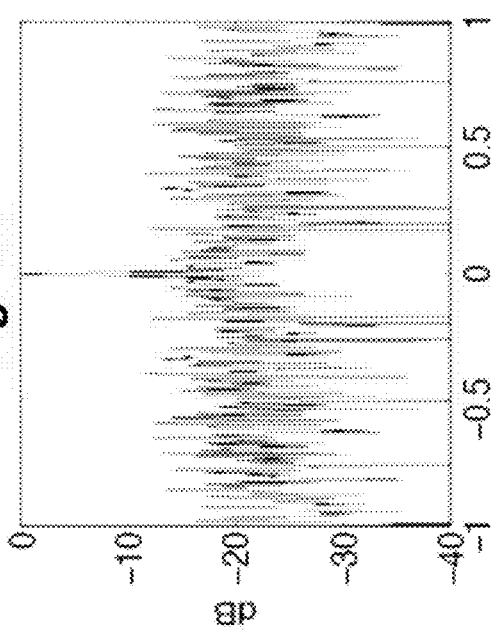
Fig. 3A
Fig. 3B
Fig. 3C
Fig. 3D Prior Art

METHOD AND SYSTEM FOR COMPRESSIVE ARRAY PROCESSING

FIELD OF THE INVENTION

This invention relates generally to signal processing with sensor arrays, and more particularly to signal processing using compressive sensing.

BACKGROUND OF THE INVENTION

Compressive Sensing

Compressive sensing (CS) has redefined signal acquisition systems, as well as signal processing systems. Conventional systems rely on a fine, high-rate sampling, intending to acquire as much information as possible before processing the signal. In contrast, CS uses an appropriate signal model, such as sparsity, so that the burden of frequent sampling can be significantly reduced, perhaps at the expense of increased processing that incorporates the signal model.

Array Signal Processing

Array signal processing is a field always in search of ways to reduce sampling complexity. Scenes sensed by array processing, at least when background and clutter is suppressed, are often very sparse in the spatial domain, or in the case of imaging systems, after an appropriate basis transformation. For those reasons, the array processing field has used CS both in array design and in processing methodology.

A typical sensing array in a receiver includes a number of sensor elements, each sensing a signal field. During passive sensing, the signal field is generated by transmitters (sources) in a scene, and a shape and timing of transmitted signals is not known. During active sensing, the array transmits, and then receives signals (echoes) reflected by the scene. In either case, the goals is to reconstruct the scene based, as best as possible, from the received signal, to determine, for example, whether objects in the scene are transmitters or reflectors, in the case of the passive array, or reflectors in the case of the active array.

Compressive Sensing and Sampling

CS systems measure signals of interest at a rate determined by an information content of the signal, typically measured by the number of non-zero components, which characterizes sparsity if the number is substantially small compared to the number of zero components.

Typically, the measuring is according to a linear acquisition system $$r = As + n,$$

where r denotes the sensed data, s a sensed signal, n acquisition noise, and A a matrix describing the linear acquisition system.

The signal is assumed to be K-sparse or K-compressible in some basis, i.e., the K largest components of the signal. This basis acquires all or most of the energy of the signal. Under this assumption, the signal can be recovered by solving a convex optimization problem $$\hat{s} = \underset{s}{\operatorname{argmin}} \|s\|_1 \text{ s.t. } r \approx As$$

or a greedy procedure minimizing $$\hat{s} = \underset{s}{\operatorname{argmin}} \|r - As\|_2^2 \text{ s.t. } \|s\|_0 \leq K.$$

Under certain conditions on the matrix A, those methods are guaranteed to provide the correct solution even with noise and model mismatches.

Restricted Isometry Property (RIP)

A restricted isometry property (RIP) characterizes matrices that are nearly orthonormal when operating on sparse vectors. RIP one of the best known and widely used condition to provide the above guarantees. The matrix A satisfies the RIP of order A with an RIP constant δ if $$(1-\delta)\|s\|_2^2 \leq \|As\|_2^2 \leq (1+\delta)\|s\|_2^2,$$

for all K-sparse signals s. In other words, the linear system satisfies the RIP if it preserves the norm of K-sparse signals. To guarantee recovery of the K-sparse signals and accuracy, the system must satisfy the RIP of order 2K with constant δ ≤ √2−1.

Since the advent of CS, a large number of practical ways of implementing systems exhibiting the RIP have been developed. The systems of interest are based on time-domain systems, such as a random subsampler or a random demodulator, which are designed to measure time signals sparse in the frequency domain. All of those systems implement a linear acquisition system $$r = AF^{-1}s, \tag{1}$$

where F is a discrete Fourier transform (DFT) matrix, and s is the sparse or compressible frequency representation of the time domain signal $x = F^{-1}s$. The goal of those designs is to ensure the system $AF^{-1}$ satisfies the RIP.

SUMMARY OF THE INVENTION

The embodiments of the invention provide a method and system for compressive array processing by using randomization to significantly reduce the sampling burden in the array hardware. This reduction does not cause a significant degradation of performance, especially when sparse reconstruction methods are used reconstruct the scene and detect the targets of interest in the scene.

The compressive array systems have a smaller number of analog-to-digital (A/D) converters for signal acquisition, when compared with conventional arrays. Instead of sampling each array element with an independent A/D converter as in the prior art, the compressive array system according to the embodiments form a few linear combinations of signals, as sensed by subsets of array elements. The subset of elements that are actually used by a specific implementation are determined during a design phase, which removes elements from a full array, or groups elements to a single channel so that cost of the system can be reduced, with reducing the system's performance.

The linear combinations are then sampled. The linear combinations may or may not be completely arbitrary. To form the linear combinations, only addition (or subtraction) of signals may be used. The adders are easy to implement in analog circuits before the A/D conversion.

The present compressive array processing significantly reduces the complexity of the array hardware. This reduction has a minimal performance penalty, especially when the processing is combined with sparse reconstruction methods.

BRIEF DESCRIPTION OF THE DRAWINGS

FIG. 3A, FIG. 3B, FIG. 3C, and FIG. 3D are beam patterns for the arrays of FIGS. 2A, 2B, 2C and 2D, respectively.

DETAILED DESCRIPTION OF THE PREFERRED EMBODIMENTS

The embodiments of the invention provide a method and system for compressive array processing. The embodiments are based, in part, on uniform arrays, linear or planar, in a far-field approximation. The arrays include sensors arranged on a uniform one-dimensional grid or two-dimensional grid, respectively.

A scene to be sensed is at a relatively large distance from the array, such that the signals transmitted or reflected by the scene can be approximated as planar waves at the array. The arrays can be passive or active, and linear or planar.

Method and System Overview

Figure 1:
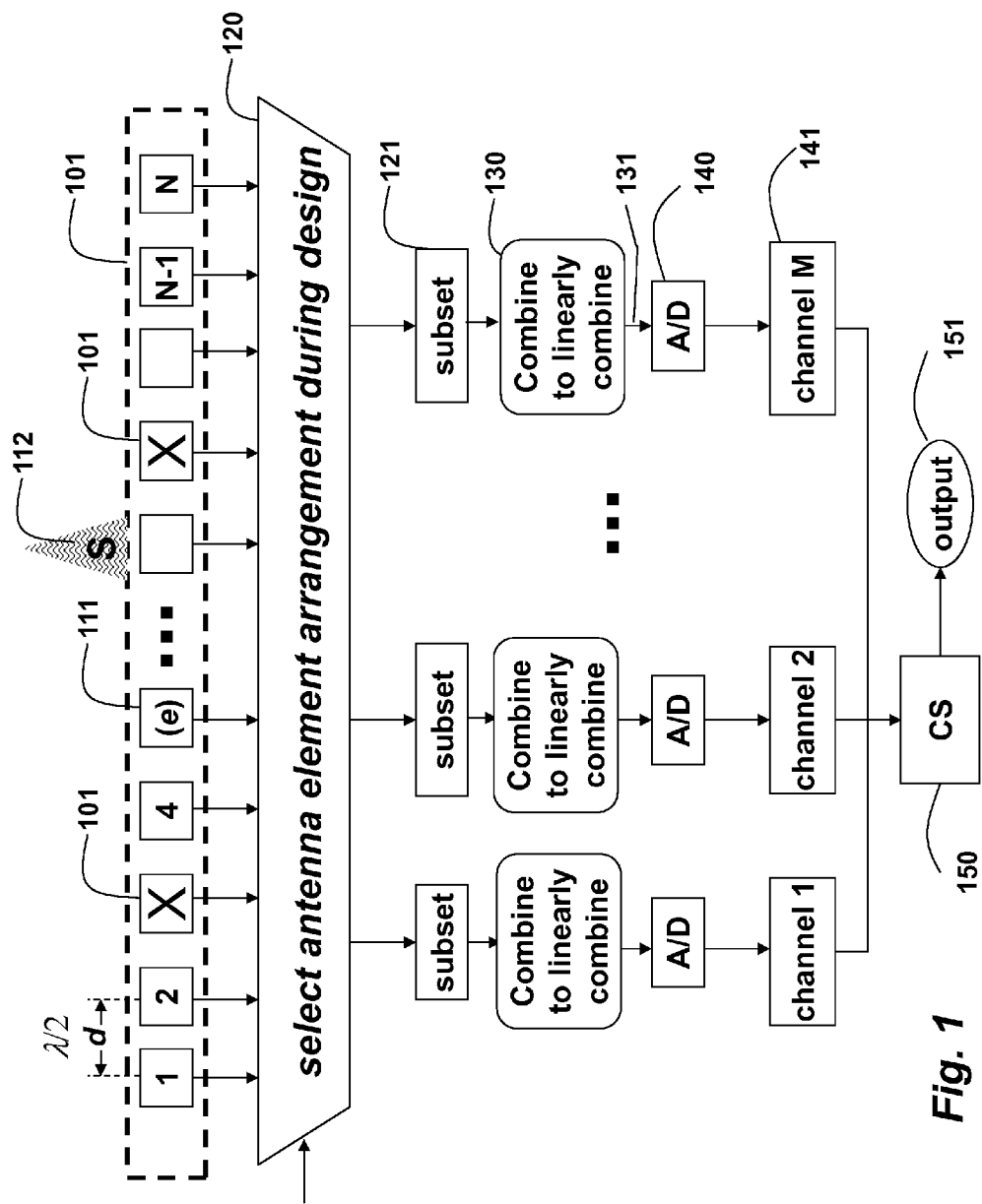
FIG. 1 is a schematic of a method for processing signals received by a linear array of sensing elements according to embodiments of the invention.

As shown in FIG. 1, the design starts with a linear array of N sensing elements e 111 spaced apart by a distance typically equal to d=λ/2 or less, where λ is the wavelength of the waves received by the array. This is also the same as the conventional design in the prior art of a typical linear array. The design in this invention removes elements from the conventional design, thus reducing its cost. One object of the invention is to design the array with the smallest number of antenna elements and channels, without sacrificing performance. The design phase effectively selects 120 which array positions are to include elements, The selection 120 can also group antenna elements so that signals received by a particular group are processed by a single channel. The positions and selections can be done in a mix and match manners, e.g., to interleave elements in multiple groups.

During the design phase, we start with a full array design. Then, we remove elements as necessary. Elements can also be grouped or mixed into a smaller number of channels. After the design phase, we have a fixed system with a reduced number of elements and/or channels. Thus, if elements or channels are not needed, then we remove them from the design because these are expensive.

Each of the remaining elements receives a signal s 112. Signals to be processed can be selected 120 into M subgroups, where M is substantially less than N. As defined herein, a subset can have one or more signals, and each of the signals can belong to more than one subset, see FIGS. 2A, 2B and 2C.

The signals in each subset are combined linearly in a combiner 130 to produce combined signal 131. The combined signals are than sampled 140 by A/D converters to form signals for M output channels 141. Since the output channels are much fewer than the L elements of a conventional array with the same design, the sampling cost is significantly decreased. The output channels can then be processed using compressive sensing (CS) 150. An output of the CS can be a reconstruction of a scene sensed by the array.

Specifically, an N-element array is used by embodiments of the invention. The number of elements can be in the hundreds. During the design, the sensing elements are arranged on a uniform planar grid with spacing d=λ/2, where λ is a wavelength. Element n is positioned at spatial coordinate $p_n = (nd, 0)$. If the array is linear and passive, then it is not possible to detect a distance to the scene. Instead, only the direction with respect to the array axis can be identified by a 2-dimensional unit vector. As described below, during the design elements can be removed or grouped to reduce the cost of the system.

Discretizing the directions in the scene to a L-size grid, each direction u is denoted using $$u_l = \frac{2l}{L} - 1, l = (u_l, \sqrt{1 - u_l^2}), l = 0, \ldots, L-1.$$

If the array operates at center frequency $f_o$, then the received signal at array element n is a linear combination of all signals transmitted at that frequency.

This is expressed in a frequency domain by the following propagation equation $$R_n(f_0) = \sum_l S_l(f_o) e^{-j2\pi f_o \langle n, l \rangle},$$

where $R_n(f_o)$ denotes the signal received by array element n and $S_l(f_o)$ the signal emitted by a transmitter or reflector from direction l, both at frequency $f_o$.

Using λ to denote the wavelength of the signal at frequency $f_o$ and c to denotes the speed of wave propagation in a medium, e.g., air or water, between the scene and the array, a convenient choice of the array elements distance is d=λ/2=c/2$f_o$. At this distance, the elements of the array sample the signal field at a spatial equivalent of the Nyquist rate, with the spatial resolution determined an array aperture size Nd.

Positioning the elements closer oversamples the field, reduces the aperture size and, therefore, reduce a resolution of the array. Positioning the elements farther undersamples the field, introduces spatial aliasing and ambiguities in the reconstruction. These ambiguities also manifest in the beam pattern of the array, in the form of grating lobes, see FIG. 3D.

If the array elements are spaced apart at the distance d=λ/2, and the angular grid is set to have the same size as the array grid, i.e., L=N, then the propagation equation (1) becomes a discrete Fourier transform (DFT) applied to the spatial signal s, and can be solved using a fast Fourier transform (FFT). For finer or coarser grids or different array element spacing, the propagation equation can typically be implemented using simple manipulations combined with the FFT, such as zero padding, aliasing, or both.

The above designs can be extended to planar arrays, where the operation becomes a two-dimensional Fourier transform, which is separable along each dimension. A planar array can distinguish signals in a two-dimensional directional space.

Array Architecture Model

As described above, a uniformly spaced array, with d=λ/2, implements the DFT from a source grid to the array elements. The goal is to provide array designs using this property. The designs modify a full uniform array to implement a linear acquisition system A, such that the array manifold matrix, i.e., the transfer function from the source grid to the array output is AF. Due to the time-frequency properties of the DFT, this system has the same RIP properties as $AF^{-1}$.

The matrix A represents the array hardware, wherein the N=L array elements acquire the signals for M output channels. Each channel corresponds to a row of A, and each array element to a column. The output of each channel is a linear combination of the signals acquired by each element weighted by the corresponding coefficients in the matrix. This linear combination is performed in the analog domain, and the output is sampled by an A/D converter to a digital channel.

To reduce the sampling burden, i.e., the number of A/D converters, the rows of A should be fewer than the number of columns. Furthermore, the matrix A is designed for efficient analog computation. Otherwise, gains by reducing the sampling complexity are lost by increasing the analog circuit complexity.

To design these systems, several methods can be used. Starting from a full array, a simplest option is to randomly select subsets of the signals from the array elements that are to be used for the sensing. This is equivalent to setting the corresponding column of A to zero for the signals from elements that are not to be used. Next, linear combinations of the selected signals with weights ±1 are determined.

Non-zero coefficients with magnitude other than 1 require the use of gain elements, which are typically more complex and expensive to implement, and often introduce noise. Furthermore, the fewer the array elements involved in each linear combination, the simpler the wiring of the acquisition hardware. In the extreme case of a single non-zero coefficient per channel, summation circuitry is not required at all.

Compressive Array Architectures

Figure 2B:
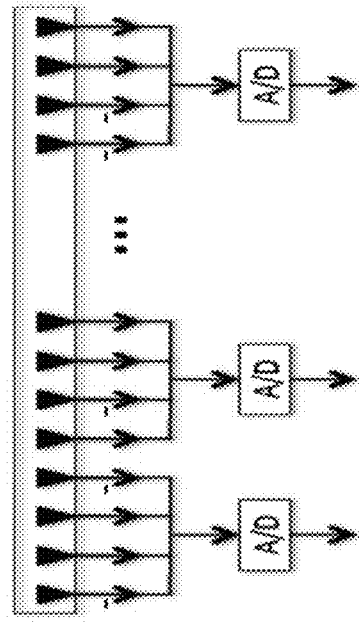
FIG. 2B is a schematic of an array with random subarray modulation according to embodiments of the invention.
Figure 2D:
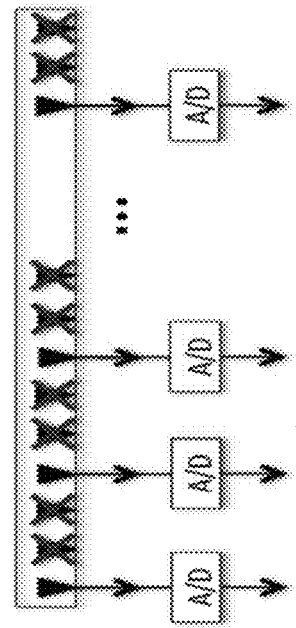
FIG. 2D is a schematic of a uniform subsampled array according to the prior art.
Figure 2A:
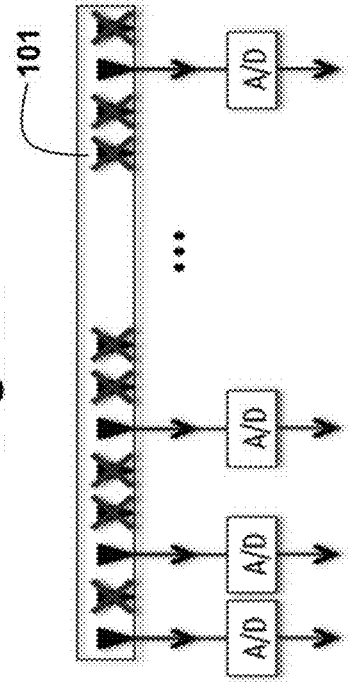
FIG. 2A is a schematic of an array with random array subsampling according to embodiments of the invention.
Figure 2C:
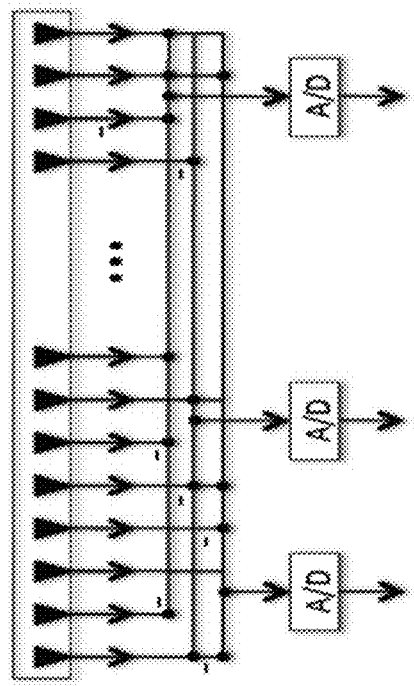
FIG. 2C is a schematic of an array with random array mixing according to embodiments of the invention.

As shown in FIG. 2A, FIG. 2B, and FIG. 2C, three three different architectures are described, respectively random array subsampling 2A, random subarray modulation 2B, and random array mixing 2C. The first two are inspired by time-domain techniques, namely random subsampling and random demodulation. The third exploits the non-causal properties of array processing to introduce more mixing among array components.

Below, these three architectures are compared with a conventional uniformly subsampled array as shown in FIG. 2D. The goal in these designs is to reduce the number of output channels and, consequently, the number of acquisition circuits of the array.

The architecture shown in FIG. 2A uses a random subsampling of the signals acquired by the uniform array. Specifically, starting with a uniformly spaced array, with λ/2 element spacing, the signals from the array elements are randomly selected to form subsets. In effect, array elements (X) 101 are randomly removed until the number of remaining elements is the same as the number of desirable output channels M, and there is one signal for each subset. The signals from the remaining elements are individually sampled, i.e., each corresponds to an output channel. The corresponding $A_S$ is derived by deleting rows from the identity matrix corresponding to the each array element removed $$A_S = \begin{bmatrix} 1 & 0 & 0 & 0 & 0 & 0 & \ldots & 0 \\ 0 & 0 & 0 & 1 & 0 & 0 & \ldots & 0 \\ \vdots & & \ldots & & & & \ddots & \vdots \end{bmatrix}.$$

Thus, the manifold matrix AF satisfies the RIP with a very high probability.

The architecture shown in FIG. 2B produces an M-channel output using L elements. The signals are sequentially selected in groups of $\lceil L/M \rceil$ (ceiling) or $\lfloor L/M \rfloor$ (floor) signals, such that each signal is a member of only one subset. The signals in each subset are combined to form one output channel, using a linear combination of ±1 weights selected randomly at the design stage. For example, if L/M=3, the acquisition matrix $A_D$ could be:

$$A_D = \begin{bmatrix} 1 & -1 & 1 & 0 & 0 & 0 & \ldots & 0 & 0 & 0 \\ 0 & 0 & 0 & -1 & -1 & 1 & \ldots & 0 & 0 & 0 \\ \vdots & & \ldots & & & & \ddots & & & \vdots \end{bmatrix}.$$

The RIP properties of the manifold matrix $A_F$ are known for time-domain random demodulators.

This architecture is somewhat similar to conventional nested array architectures, which combine sub-arrays to form a larger array with desired properties but using fewer elements and A/D converters. However, instead of forming an array of regular subarrays, each subarray is formed using a random linear combination of its elements.

The architecture shown in FIG. 2C uses a random linear combination of signals constructed as follows. Each signal has a non-zero weight in the linear combination comprising each channel with a fixed probability, and a coefficient of the linear combination is randomly selected from ±1. Thus, the acquisition matrix $A_M$ is a sparse matrix with randomly placed ±1 elements:

$$A_M = \begin{bmatrix} 1 & 0 & -1 & 1 & 0 & 0 & \ldots & -1 \\ 0 & -1 & 0 & 1 & 0 & 0 & \ldots & 1 \\ \vdots & & \ldots & & & & \ddots & \vdots \end{bmatrix}.$$

An RIP proof is possible using the standard proof techniques. Experimental results indicate that $A_M F^{-1}$ satisfies the RIP performs slightly worse than the other two architectures.

Once a design is determined, its implementation is fully known to the manufacturing and processing methods. A design that is non-random but exhibits similar architectural Characteristics (e.g., non-uniformity and non-regularity in grouping) can also be used. A design that is non-random but exhibits similar architectural characteristics (e.g., non-uniformity and non-regularity in grouping) can also be used.

The three architectures are compared with the uniformly subsampled array of FIG. 2D, which is known to introduce ambiguities, such as grating lobes (see FIG. 3D), and does not satisfy the RIP. That array uniformly subsamples a full array, with the distance between the remaining nearby elements being constant. As with the randomly subsampled architecture in FIG. 2A, the number of output channels of this architecture is the same as the number of array elements.

Reconstruction

The main characteristic of interest is the beampattern of the array. The beampattern characterizes how similar a signal arriving from a certain direction is to the signals arriving from all other directions.

Ideally, the beampattern should have a peak in the direction of interest and be as close to zero as possible in all other directions. Thus, when performing conventional beamforming, i.e., when the scene is reconstructed from r in equation (1) using the matched filter $$\hat{s} = (AF)^* r = F^{-1} A^*,$$

where (•)* denotes an adjoint operator, i.e., a signal arriving from a particular direction does not match with other direction vectors, and causes spurious images and false alarms.

The beampattern also plays an important role in CS systems. In the terminology of CS, the beampattern measures the coherence of the vector corresponding to the direction of interest with all other vectors in the manifold matrix AF. Low coherence helps improving CS reconstruction.

FIGS. 3A, 2B, 3C, and 3D show sample beampatterns of the four systems and in the same order as FIGS. 2A, 2B, 2C and 2D. All sample beampatterns correspond to systems with N=256 elements, subsampled to M=64 channels, measured against a grid of directions much denser than N. The beampatterns for the randomized array systems have very similar characteristics, such as sidelobe levels and main lobe widths. Thus, the systems is expected to perform similarly.

The uniformly subsampled system in FIG. 2D exhibits grating lobes, i.e., the beam pattern has several peaks. This means that the signals coming from those directions are exactly identical to the signal coming from the direction of interest and cannot be distinguished by any method.

Note that the beampatterns for the systems in FIGS. 2A and 2D are shift-invariant, whereas the ones in FIGS. 2B and 2C are not. In other words, the shape of the beampattern changes because signals in FIGS. 2B and 2C are directed in different directions, although its main characteristics remain the same.

The beamwidth, i.e., the width of the main lobe of the beampattern, which depends on the array aperture, also determines the resolution of the array. Two sources located less than a beamwidth apart are very difficult to separate, especially with conventional techniques.

Even using CS techniques, the two signals have very coherent signatures, which means conventional CS methods might fail. Furthermore, if the angular grid is very dense, the array manifold vectors from each direction are very similar, which can confuse some CS reconstruction methods.

To overcome this problem, model-based CS is used. Specifically, a model that requires the non-zero elements of the reconstructed signal to be more than a beamwidth apart is enforced. This is straightforward with greedy procedures by introducing model-based truncation, which, when used at each iteration of the procedure, selects the peaks and truncates the signal according to the model. While enforcing the model will still miss signals that originate from very similar directions, it significantly improves the reconstruction by ensuring that a strong source does not overwhelm other sources by forcing the reconstruction procedure to select multiple non-zero directions in its main lobe.

Figure 4:
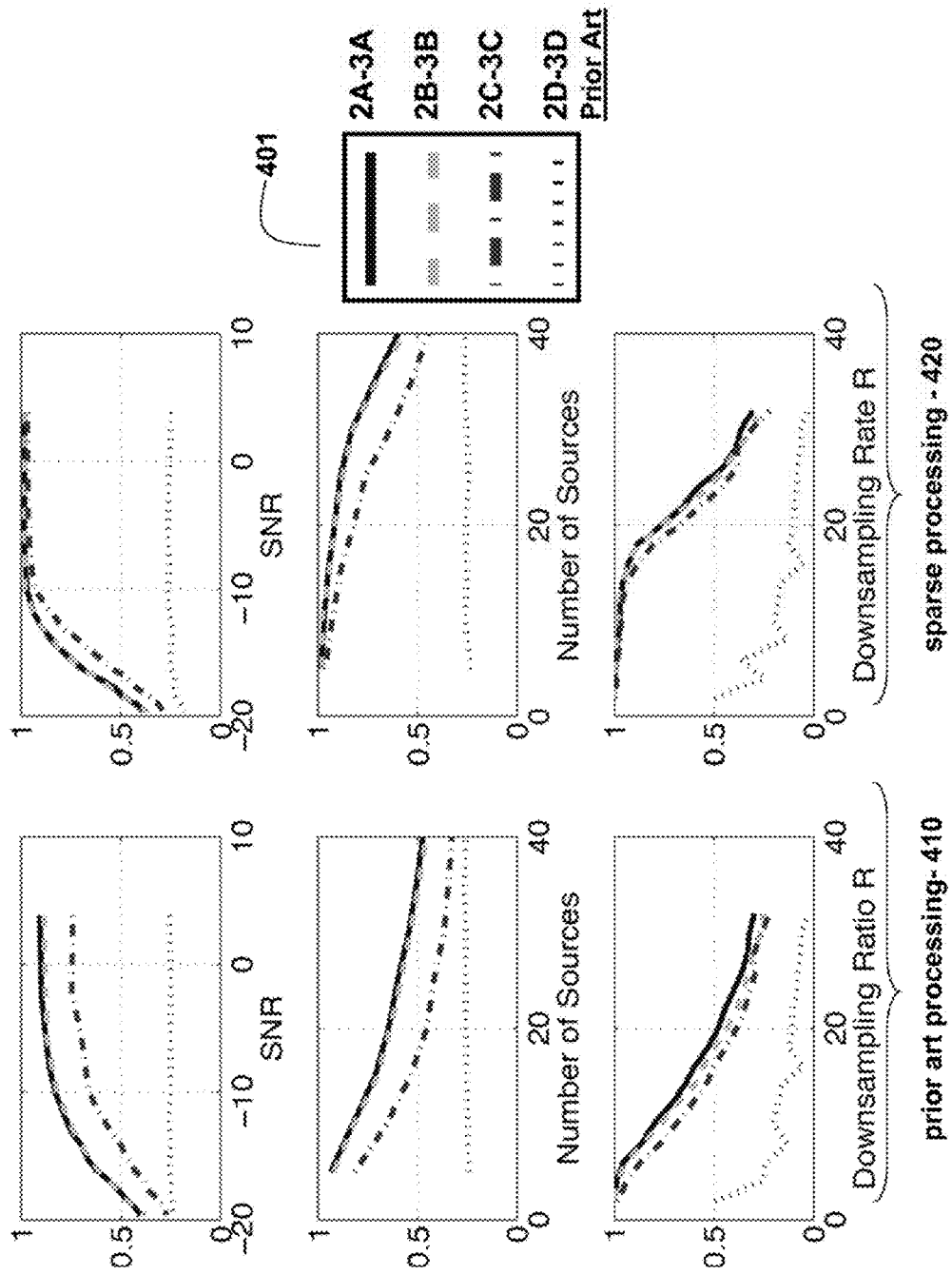
FIG. 4 are graphs comparing performances of conventional processing and compressive sparse array processing for the arrays of FIGS. 2A, 2B, 2C and 2D and the corresponding beam patterns 3A, 3B, 3C, and 3D.

The graphs in FIG. 4 compare experimental results for conventional 410 and sparse sampling 420 for the four designs 2A, 2B, 2C, and 2D in legend 401 corresponding to respectively to the array designs shown in FIGS. 2A, 2B, 2C and 2D.

The results show probability of detection as a function of the SNR, number of sources, and downsampling rate R (top to bottom), for conventional and sparse processing (left and right), respectively. Sparse processing according to embodiments of the invention significantly outperforms conventional methods.

Effect of the Invention

Array architectures according to embodiments of the invention using compressive sensing can significantly reduce the number of channels necessary for successful array processing.

These architectures, especially when combined with sparse reconstruction methods, enable array designs with significantly fewer components and little or no compromise in performance.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for processing signals comprising:
    positioning sensing elements of a sensor array in a uniform grid of L locations, wherein each sensing element is an antenna, wherein the sensing elements are grouped into M subsets wherein each subset contains one or more sensing elements, and each sensing element is a member of one or more subsets, and wherein the uniform grid has a spacing less than or equal to half a wavelength of the signals received by the sensor array;
    receiving the signals using the sensing elements of the sensor array;
    combining, in a combiner, the signals received by the sensing elements in each subset to produce combined signals; and
    sampling, in analog-to-digital converter, each combined signal to form an output channel.

2. The method of claim 1 wherein the method further comprises:
    processing the output channel of each combined signal.

3. The method of claim 2, wherein the processing uses compressive sensing.

4. The method of claim 3, wherein the compressive sensing uses a model that requires non-zero elements of a reconstructed signal to be more than a beamwidth apart.

5. The method of claim 4, wherein the processing performs detection of objects.

6. The method of claim 1, wherein the sensor array is planar.

7. The method of claim 1, wherein the combining is performed in an analog domain.

8. The method of claim 7, wherein the combining is linear and uses combination coefficients that are only ±1.

9. The method of claim 1, wherein the combining performs a linear combination.

10. The method of claim 9, wherein the combining is linear and uses coefficients that are randomly selected from ±1.

11. The method of claim 1, wherein the sensing elements are grouped randomly to produce M subsets each including one or more sensing elements.

12. The method of claim 1, wherein the grouping sequentially groups the sensing elements into the M subsets.

13. The method of claim 12, wherein the subsets include $\lceil L/M \rceil$ or $\lfloor L/M \rfloor$ sensing elements, and such that each sensing element is a member of only one subset.

14. The method of claim 1, wherein the grouping randomly groups multiple sensing elements in multiple subsets such that each sensing element is a member of each subset with a fixed probability, and each subset contains multiple sensing elements.

* * * * *